US011741936B2

(12) United States Patent
Yeboah

(10) Patent No.: US 11,741,936 B2
(45) Date of Patent: Aug. 29, 2023

(54) ACOUSTIC AWARENESS PLATFORM

(71) Applicant: Department of the Army

(72) Inventor: Jackson Yeboah, Fort Bragg, NC (US)

(73) Assignee: The U.S. Government as Represented by the Secretary of the Army, Washington, DC (US)

( * ) Notice: Subject to any disclaimer, the term of this patent is extended or adjusted under 35 U.S.C. 154(b) by 181 days.

(21) Appl. No.: 17/401,667

(22) Filed: Aug. 13, 2021

(65) Prior Publication Data

US 2022/0051651 A1 Feb. 17, 2022

Related U.S. Application Data

(60) Provisional application No. 63/065,588, filed on Aug. 14, 2020.

(51) Int. Cl.
*H04B 1/00* (2006.01)
*G10K 11/178* (2006.01)
*B64C 39/02* (2023.01)
*H04R 3/00* (2006.01)
*B64U 20/10* (2023.01)
*B64U 50/14* (2023.01)

(52) U.S. Cl.
CPC ........ *G10K 11/1785* (2018.01); *B64C 39/024* (2013.01); *B64C 2220/00* (2013.01); *B64U 20/10* (2023.01); *B64U 50/14* (2023.01); *G10K 2210/1281* (2013.01)

(58) Field of Classification Search
CPC ........ G10K 11/1785; G10K 2210/1281; B64C 39/024; B64C 2220/00; B64U 20/10; B64U 50/14
USPC ...................................................... 381/86, 92
See application file for complete search history.

(56) References Cited

PUBLICATIONS

Visualization of environmental audio using ribbon plots and acoustic state sequences Yvonne F. Phillips, Michael Towsey and Paul Roe QUT Ecoacoustics Research Group Electrical Engineering and Computer Science School (Year: 2016).*

* cited by examiner

*Primary Examiner* — Ammar T Hamid

(57) ABSTRACT

An advanced acoustic awareness platform configured to classify environmental sounds. The advanced acoustic awareness platform comprises an audio signal acquisition sensor array and one or more processors programmed to augment the audio signal, extract features for the audio signal, visualize, and classify the signal using one or more labels. In at least one embodiment, the signal is classified based on transfer learning associated with a pretrained machine learning model.

12 Claims, 5 Drawing Sheets

ACOUSTIC AWARENESS PLATFORM

This application claims the benefit of U.S. Provisional Application No. 63/065,588 filed Aug. 14, 2020 incorporated herein by reference.

BACKGROUND

The drone market is projected to approach $43 billion by 2024, up from $14 billion only a few years ago. This is due to the increase of applications to which drones are now being applied to. Some applications include aerial photography, package delivery, agriculture monitoring, 3D mapping, entertainment as well as military uses such as reconnaissance and target acquisition. As the market grows, new applications will likely continue to evolve.

Initially, most drones either resembled model aircraft used for surveillance, or full size aircraft, designed for military long range, high altitude weapons and surveillance platforms. Relatively simple toys followed, with little or no onboard stabilization or capacity for payloads. In recent years, however, their flying capabilities have improved significantly, making them safer, smarter, more stable and easier to control. As a result, small drones have evolved from toys to controllable aircraft capable of carrying cameras for photo survey, surveillance, and broadcast applications.

One of the key factors in this improvement has been the use of high-performance micro-electro-mechanical system (MEMS) sensors. MEMS technology enables miniaturization, mass production and cost reduction of many sensors, and the market for this technology is growing fast. Traditionally, drones have used optical sensors to experience the word around them. Traditionally reconnaissance and target acquisition duties are accomplished using optical sensors. Due to their small size and noisy operating environment, acoustic sensors have not traditionally been employed for surveillance or target acquisition. An acoustic system, when coupled with the traditional optical sensor systems featured on a UAV markedly improves the UAVs ability to efficiently identify and discriminate between targets.

SUMMARY

A drone having an advanced acoustic awareness platform. In one embodiment, the drone includes an embedded signal processor that executes at least two deep learning techniques to discern and classify several environmental sounds. In another embodiment, the advanced acoustic awareness platform is an accessory to the drone. The advanced acoustic awareness platform attaches to the drone and enhances acoustical situational awareness. The advanced acoustic awareness platform obtains sounds signals from a sensor array and processes the sound signals to classify them based on, among other things, features extracted from the signals.

BRIEF DESCRIPTION OF THE FIGURES

Embodiments of the invention and their advantages are best understood by referring to the detailed description that follows. It should be appreciated that the figures are provided as an aid to the reader and should not be construed as limiting the scope of embodiments of the invention described in the detailed description. Some embodiments of the invention are illustrated by way of example, and not by way of limitation, in the figures of the accompanying drawings, where like reference numerals refer to similar elements.

FIG. 5 illustrates a computer-implemented method that may be performed by the advanced acoustic awareness platform upon capturing one or more audio signals from the environment in accordance with one or more embodiments of the invention.

DETAILED DESCRIPTION

An advanced acoustic awareness platform is configured with a sensor array and a classifier. The sensor array captures a variable duration audio signal and transmits the audio signal to a classifier. The classifier receives the audio signal and predicts the type of environmental sound corresponding to the captured audio signal. In certain embodiments, the classifier attaches an environmental label to a short duration (e.g., 2 millisecond) signal. Embodiments of the invention are explained below with reference to the Figures. However, those skilled in the art will readily appreciate that the detailed description given herein with respect to these figures is for explanatory purposes as the embodiments of the invention extends beyond the exemplary embodiments below. For example, it should be appreciated that those skilled in the art will, in light of the detailed description, recognize alternate and suitable approaches, depending upon the needs of the particular application, to implement the functionality of any given detail described herein, beyond the particular implementation and design choices in the following embodiments described and shown. That is, there are numerous modifications and variations of these embodiments of the invention that are too numerous to be listed but that all fit within the scope of the invention. Also, singular words should be read as plural and vice versa and masculine as feminine and vice versa, where appropriate, and alternatives embodiments do not necessarily imply that the two are mutually exclusive. The advanced acoustic awareness platform may be positioned in various locations to capture audio signals. For instance, the advanced acoustic awareness platform may be positioned on the ground, air, or space.

In certain embodiments, a drone captures environmental sounds and classifies them. The drone may include a sensor array that obtains audio signals from the environment. In one embodiment, the drone classifies the environmental sounds. In other embodiments, the audio signal is transmitted to a processing element in the air or space to classify the sound based on the current altitude or weather. In alternative embodiments, the drone transmits the audio signal to a ground station to process and classify the environmental sounds.

Figure 1:
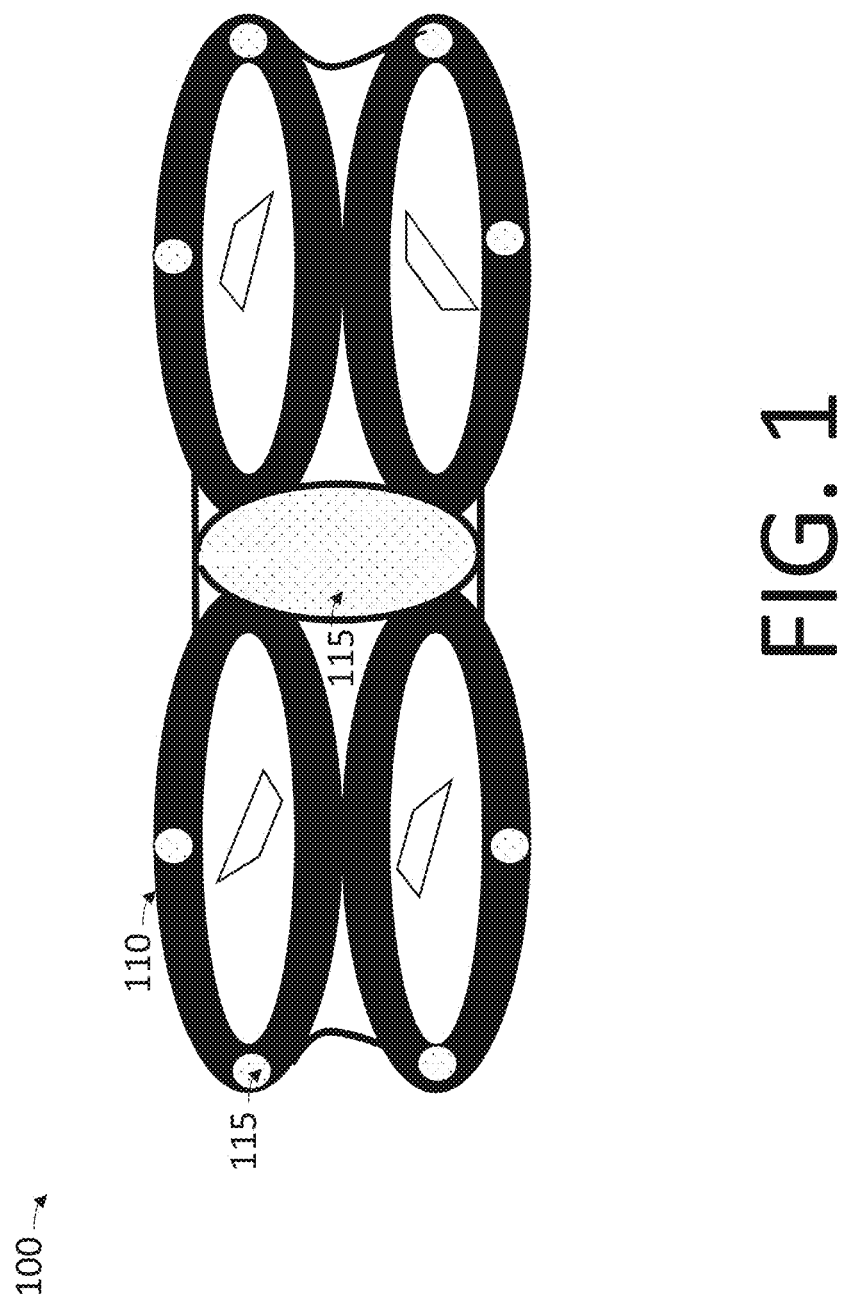
FIG. 1. illustrates a drone having a sensor array that captures audio signals for processing by an advanced acoustic awareness platform in accordance with at least one or more embodiments of the invention.

FIG. 1. Illustrates a drone 110 having a sensor array 115 that captures audio signals for processing by an advanced acoustic awareness platform in accordance with at least one or more embodiments of the invention. The drone 110 is an unmanned aerial vehicle that flies over a determined route. The drone 110 is configured with an advanced acoustical awareness platform that classifies the sounds captured by the sensor array 115 while the drone 110 flies a designated route.

The sensor array 115 captures environmental information, such as audio sounds. The sensor array 115 may include multiple microphones positioned on the drone. In one embodiment, the microphones vary in size and are directionally oriented. Based on input from an operator, the sensor array 115 may pivot and change direction. The audio signals received by the sensor array 115 are processed by an advanced acoustic platform to augment the signals, extract salient features from the augmented signals, and classify the extracted features.

In certain embodiments, the advanced acoustic platform includes several specialized components that process and classify the audio signal. The specialized components may include a sound acquisition component, an augmentation component, an extraction component, a visualization component, and a classification component. The audio signal is processed by one or more of the specialized components before assigning one or more labels to the environmental sounds.

Figure 2:
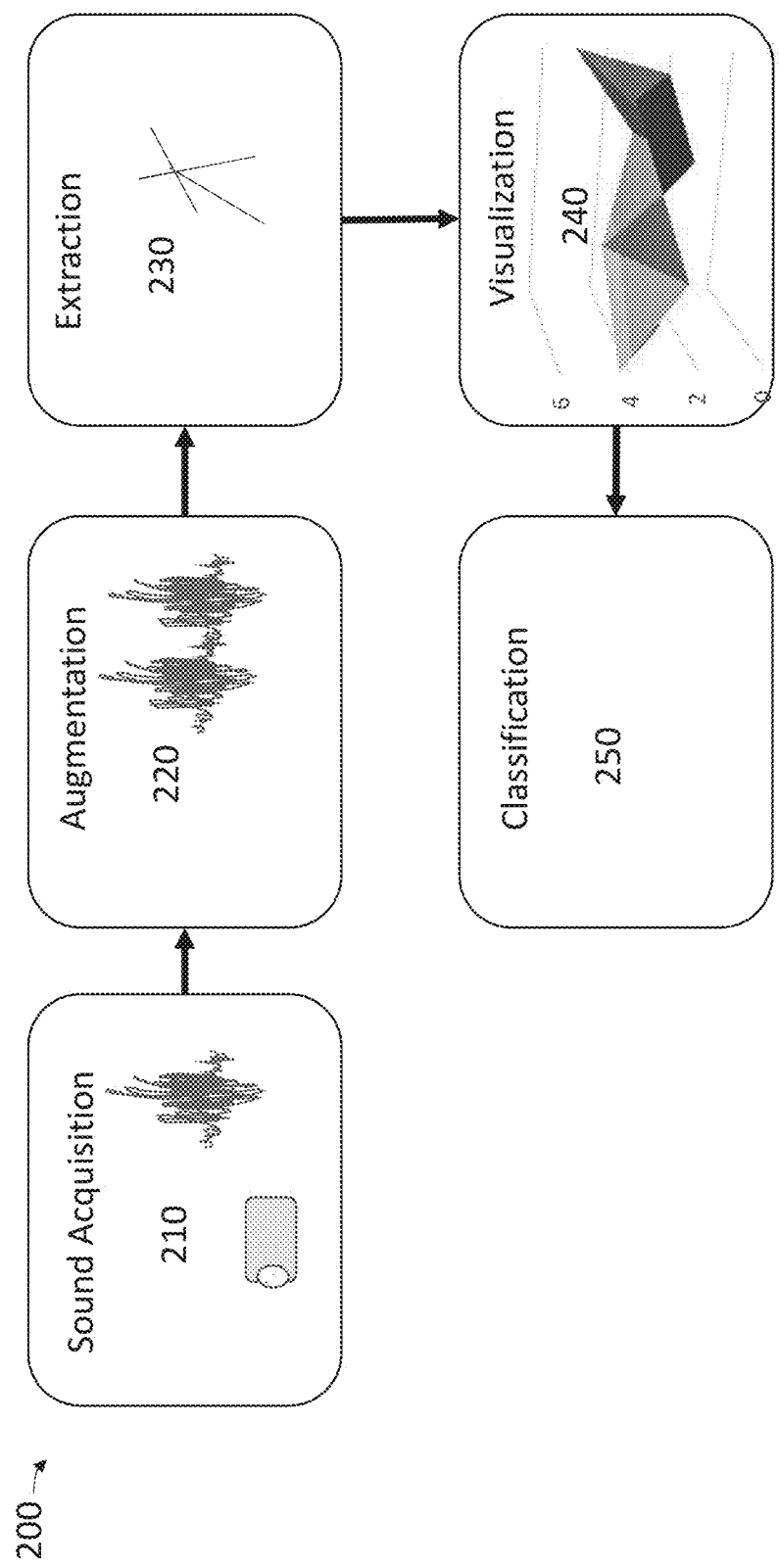
FIG. 2. illustrates a block diagram of the signal processing components of the advanced acoustic awareness platform in accordance with some embodiments of the invention.

FIG. 2. illustrates a block diagram of the signal processing components of the advanced acoustic awareness platform 200 in accordance with some embodiments of the invention. Before determining the labels for one or more environmental sounds, the corresponding audio signals are processed by sound acquisition component 210, augmentation component 220, extraction component 230, visualization component 240, and classification component 250. After the audio signal are processed by one or more of components of the advance acoustic awareness platform, several environmental sounds are identified and labeled.

The sound acquisition component 210 receives the audio signals associated with several environmental sounds. In at least one embodiment, the environmental sounds are acquired while the advanced acoustic platform 200 is attached to an unmanned aerial vehicle (e.g., a drone) or other mobile vehicle. The advanced acoustic platform 200 may capture environmental sounds while the unmanned aerial vehicle is in one of at least three modes: motion, hovering, or stationary. In other embodiments, the advanced acoustic platform 200 may be located on a ground station or another stationary location. In at least one embodiment, the sound acquisition component 210 captures a variable duration audio signals from the surrounding environment. The sound acquisition component 210 transmits the captured audio signals associated with the environmental sounds to the augmentation component 220 for some signal preprocessing.

The augmentation component 220 preprocesses the audio signal received from the sound acquisition component 210. In certain embodiments, the variable duration audio signal is less than two milliseconds. The augmentation component 220 may increase the duration of the audio signal by stitching together one or more duplicate audio signals corresponding to the variable duration audio signals that fall below an acceptable threshold. In one embodiment, the augmentation component 210 configures the acceptable threshold to be 5 milliseconds. Thus, when a signal is less than 5 milliseconds, the augmentation component 220 stitches duplicate audio signals until the duration of the stitched audio signal is larger than the acceptable threshold. In other embodiments, the signal may also be augmented with a random selection of additional audio features selected from the group comprising one or more of the following: time warping, frequency masking, time masking, Gaussian signal to noise ratio, time, and pitch stretch. These techniques are randomly selected and applied to the audio dataset prior to the feature extraction process and during the classification model development. The augmentation component 220 transmits the augmented signal to the extraction component 230 for further processing by the advanced acoustic platform 200.

The extraction component 230 receives the augmented audio signal from the augmentation component 220. The extraction component 230 filters the augmented audio signal for a set of predetermined features. In one embodiment, the predetermined features comprise at least three channels. The first channel may include a mel-spectrogram of the augmented audio signal. The second channel may include the fourier transform or discrete fourier transform elements of the augmented audio signal. In certain embodiments, the fast fourier transform technique is applied to the augmented audio signal to produce the fourier transform or discrete fourier transform. The third channel may be a derivative (e.g., directional derivative) of the second channel. In turn, these extracted features of the augmented audio signal are transmitted from the extraction component 230 to the visualization component 240. In an alternate embodiment, the extraction component 230 may extract features associated with any combination of the signal-to-noise ratio (SNR), mean of the harmonic, mean of the percussive, and the zero crossing rate from the augmented audio signal for two of the three channels extracted by the extraction component 230.

The visualization component 240 receives the extracted features from the extraction component 230. In one embodiment, the visualization component 240 creates an image from the extracted features of the augmented audio signal. The image may include at least three dimensions, where each dimension corresponds to a channel identified by the extraction component 230. The visualization component 240 transmits the image associated with the augmented audio signal to the classification component 250.

The classification component 250, in turn, receives the image that is associated with the augmented audio signal from the visualization component 240. The image is processed using one or more machine learning techniques. In some embodiments, the image is classified based on transfer learning. For instance, when the corresponding image sets are outliers (e.g. images that correspond to audio signal that have not been previously trained on by the neural network corresponding to the available machine learning models), the classification component 250 may use a more robust image classifier model to classify the audio signals. The classification component 250 may apply one or more labels to the images that correspond to environmental sounds captured by the advanced acoustic awareness platform 200. In turn, the advanced acoustic awareness platform 200 may inform the operator of the one or more labels selected for environmental sounds captured by the sound acquisition component 210.

In one embodiment, the advanced acoustic awareness platform is configurable to identify which features are extracted to visualize the audio signal by a feature extraction component. For instance, in one configuration, the feature extraction component may produce a three channel signal using, among other components, a mel spectrogram component, a fourier transform component, and a derivative of either the mel spectrogram component or the fourier transform component.

Figure 3:
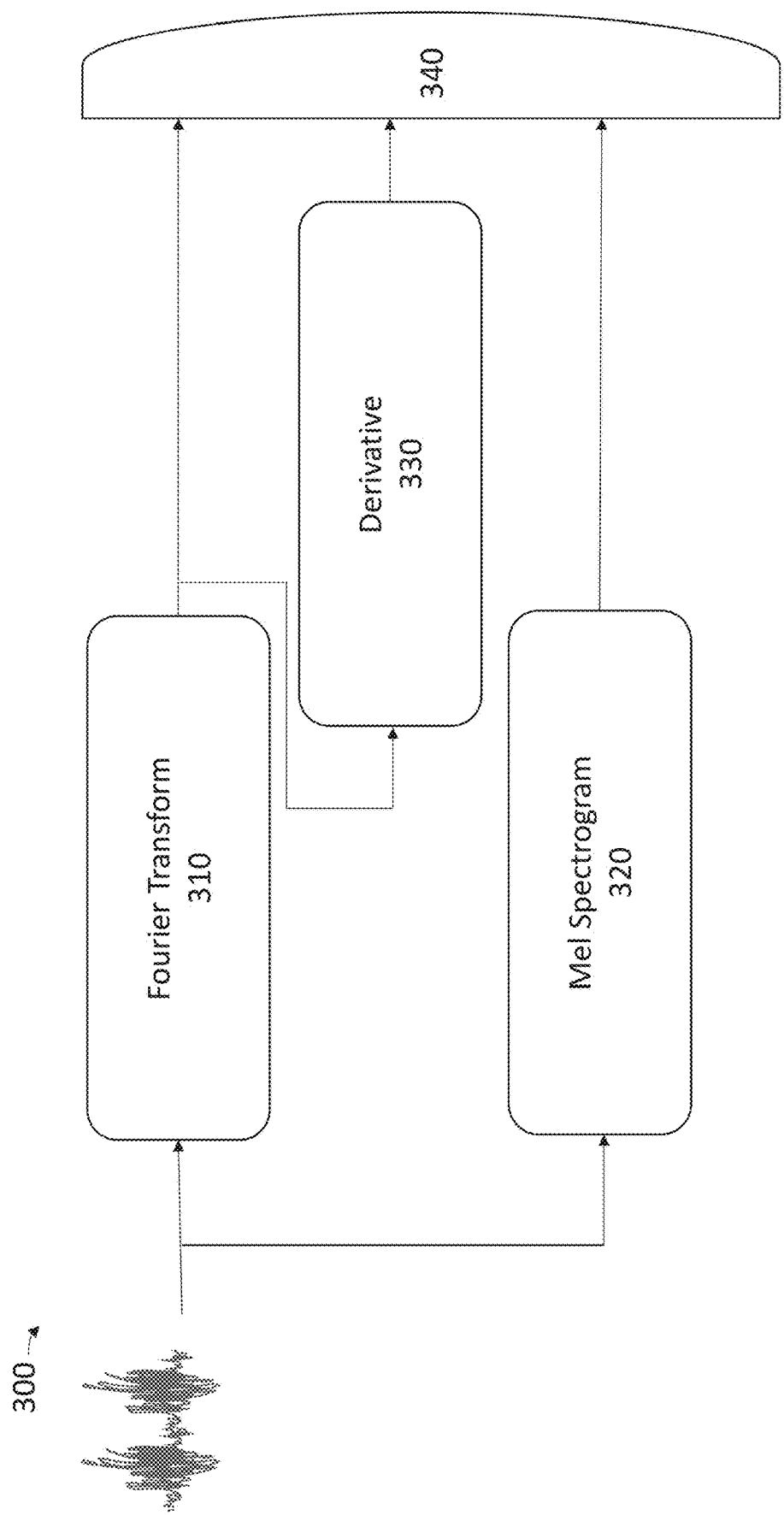
FIG. 3 illustrates a feature extraction component implemented by the advanced acoustic awareness platform in at least one embodiment of the invention.

FIG. 3 illustrates a feature extraction component 300 implemented by the advanced acoustic awareness platform in at least one embodiment of the invention. The feature extraction component 300 receives an audio signal associated with the environmental sounds and extracts at least three channels that are visualized and classified by the advanced acoustic awareness platform. In this embodiment, the feature extraction component 300 includes a fourier transform component 310, a mel spectrogram component 320, and a derivative component 330. The features extracted from the audio signal are combined by a multiplexer 340 to create a single output with at least three channels. In one embodiment, the derivative component 330 receives the features output from the mel spectrogram component 320 and produces a derivative of this signal as a third channel that is combined by the mux 340 with a first channel associated with the fourier transform and a second channel associated only with the mel spectrogram. In turn, this three-channel signal is transmitted for visualization by the advanced acoustic awareness platform.

In some embodiments, an advanced acoustic awareness platform is trained to classify at least eleven sounds that range from car horns, children playing, dog barks, drilling, drones, engine idling, gun shot, jackhammer, siren, street music, train, and unknown, among others. The platform is configurable to allow an operator to specify the distance requirement for classification and the tolerable tradeoff associated with a number of false positives associated with one or more targets of interest.

Figure 4:
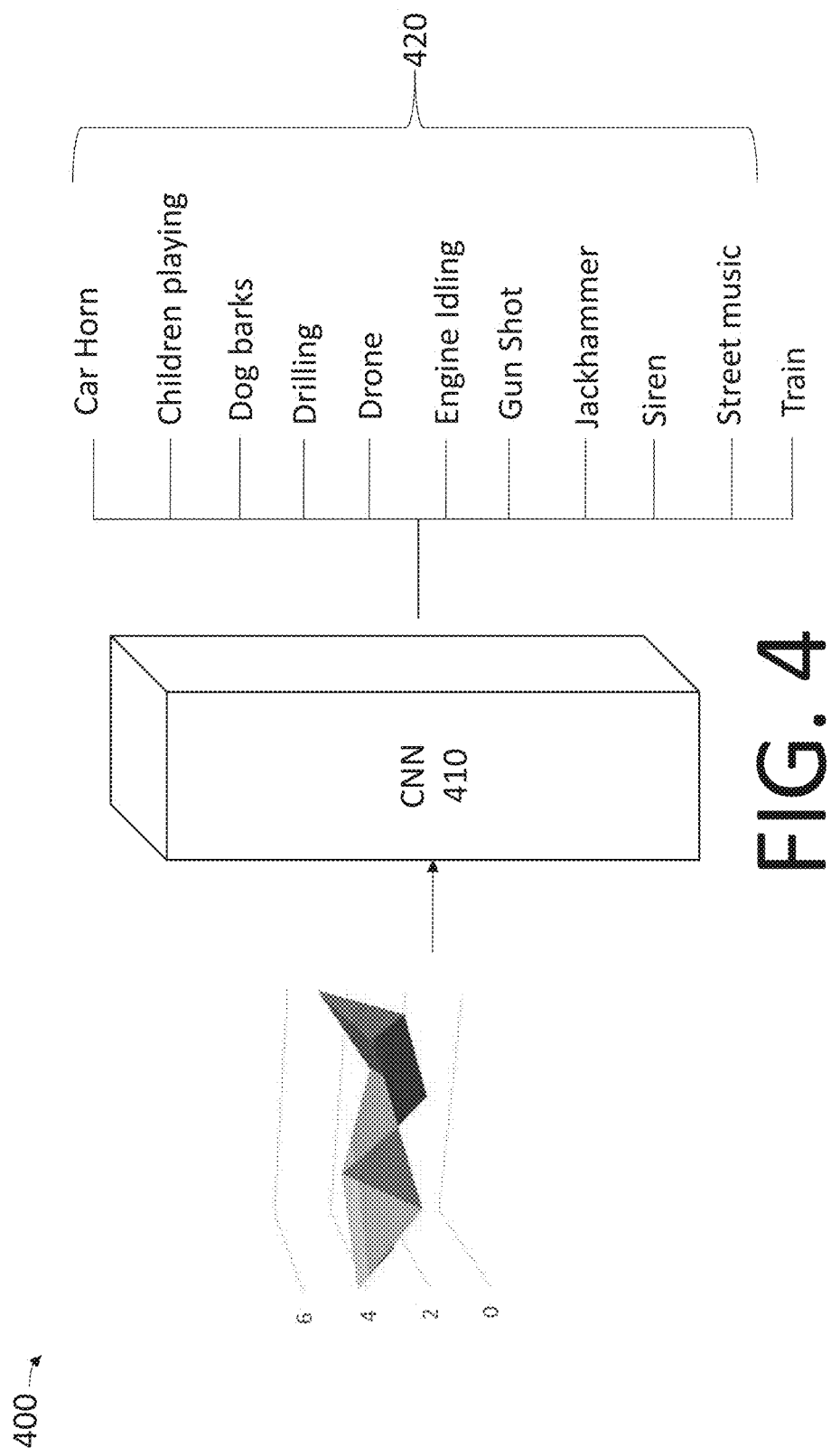
FIG. 4 illustrates a classification component that employs convolutional neutral networks to transfer learning when classifying the environmental sounds captured by the advanced acoustic awareness platform in certain embodiments of the invention.

FIG. 4 illustrates a classification component 400 that employs convolutional neutral networks 410 to transfer learning when classifying the environmental sounds captured by the advanced acoustic awareness platform in certain embodiments of the invention. In some embodiments, the classification component 400 receives an image that is the visual representation of environmental sounds captured by the advanced acoustic awareness platform. The one or more images are sent to the convolutional neural network 410 to classify and select a label 420 for the image. The labels may be selected from any of the following including, but not limited to, environmental sounds from car horns, children playing, dog barks, drilling, drones, engine idling, gun shot, jackhammer, siren, street music, train, unknown, among others. If the classification component 400 is unable to classify the signal, the unknown label 420 is selected for one or more images that represent the audio signal. In turn, the advanced acoustic awareness platform may utilize additional machine learning techniques (e.g., transfer learning) to classify the images associated with the corresponding signals.

In other embodiments of the invention, a computer with a specially programmed processor executes a method to classify signals acquired by the advanced acoustic awareness platform. The computer-implemented method, in some embodiments, includes receiving audio signals, augmenting the audio signals, extracting at least three features from the augmented audio signal, visualizing the extracted features, and classifying the audio signals based on the visualization of the extracted features. The advanced acoustic awareness platform may classify the audio signals using deep learning, a form of machine learning technique performs inferences from complex data structures (e.g., images, time-series data sequences).

FIG. 5 illustrates a computer-implemented method 500 that may be performed by the advanced acoustic awareness platform upon capturing one or more audio signals from the environment in accordance with one or more embodiments of the invention. The computer implemented method is initialized when the sensor array is powered on. In turn, the sensor array captures the audio signals in the environment and sends the captured audio signal to the advanced acoustic awareness platform for further processing. In step 510, the advanced acoustic awareness platform receives the audio signal from a sensor array.

In turn, the audio signal, in certain embodiments, is augmented by the advanced acoustic awareness platform, in step 520. The advanced acoustic awareness platform may implement preprocessing steps based on, among other things, the duration of the environmental sounds. For instance, the advanced acoustic awareness platform may duplicate the audio signal and stitch the original signal to the duplicate signal when the environmental sound of interest is below a predetermined duration threshold (e.g., 2 ms). The advanced acoustic awareness platform increases model robustness by applying the augmentation techniques to the audio data. In step 530, the augmented audio signal is further processed, by the advanced acoustic awareness platform to extract at least three features. In some embodiments, the first two channels include the mel-spectrogram and the fourier transform of the audio. The third channel may comprise of the derivative of the either of the first two channels. In one embodiment, the advanced acoustic awareness platform creates a three channel signal comprising the following: channel 1 as the mel spectrogram, channel 2 as the fourier transform, and channel 3 as the derivative of the mel spectrogram in channel 1.

The extracted features of the augmented audio signals are visualized, in step 540. In one embodiment, the visualization is performed by the advanced acoustic awareness platform. In other embodiments, the visualization may be created using a server or cloud computing element that is available on an as needed basis.

In step 550, the visualization of the extracted features are classified by the advanced acoustic awareness platform. In some embodiments, a neural network classifier is employed by the advanced acoustic awareness platform to classify the images. In one embodiment, the neutral network is stored separately and is remote from the advanced acoustic awareness platform. In alternative embodiments, the neural network is part of the advanced acoustic awareness platform. If the advanced acoustic awareness platform is unable to accurately (less than 5% false positives) and quickly (e.g., under 2 seconds) label the audio signal, the neural network implementation may employ transfer learning and execute a VGG16 neural network as a base neural network model. In certain embodiments, the neural network does not include audio signals and is not pretrained on audio. VGG16 consist of layers of convolutional networks used for feature extraction in image classification. The VGG16 pretrained neural network model used in certain embodiments, is trained exclusively on Imagenet. Because the advanced acoustic awareness platform transforms the audio signals into 3-channel images during the steps 520-540, the advanced acoustic awareness platform may employ the VGG16 trained neural network on object classification datasets to train the audio image dataset as part of the transfer learning techniques for audio classification.

In various embodiments, the advanced acoustic awareness platform employs transfer learning machine learning techniques, which involves the transfer of similar distribution of features from a pre-trained model trained on a larger dataset. In transfer learning, the advanced acoustic awareness platform prioritizes features of similar distribution to the extracted features from the audio signals. For a pretrained model (e.g., VGG16) developed from imagenet, the advanced acoustic awareness platform adjusts the number of layers of the network as most features visual objects differ significantly from audio signals. Accordingly, the advanced acoustic awareness platform prioritizes the features at the early layers of the pretrained model (convolutional neural network VGG16). These early layers from VGG16 and as such other object classification neural networks often share similar distributions due to the nature by which the convolutional network extracts simple features in early layers. As the layers progress, more refined features are extracted by the neural network. Accordingly, the advanced acoustic awareness platform, in most embodiments, discards the final stages of the pretrained neural network models and builds fully-connected layers suitable for the audio signals that it receives. The fully-connected layers allow the advanced acoustic awareness platform to classify audio signals with an acceptable level of confidence, speed, and accuracy. The computer-implemented method terminates when the images corresponding to the audio signal are classified.

Therefore, embodiments of the invention provide an advanced acoustic awareness platform that classifies variable duration audio signals. The advanced acoustic awareness platform determines when an audio signal is captured. In most embodiments, the captured audio signal is augmented. For instance, if the duration of the captured audio signal is less than an acceptable predefined threshold, the audio signal is duplicated and stitched to itself such that the ratio of a duration of augmented signal and the predetermined duration threshold is at least one. The augmented signal, in turn, is further processed by the advanced acoustic awareness platform to extract at least three features, which are visualized and classified using one or more labels that correspond to environmental sounds. The classification of the environmental sounds employ deep learning techniques to discern different sound signal in the environment based on extracted features that are visualized as an image. In some applications, the advanced acoustic awareness platform may be used to provide critical feedback on previously ignored environmental signals.

Although the foregoing embodiments have been described in some detail for purposes of clarity of understanding, the invention is not limited to the details provided. There are many alternative ways of implementing the invention. The disclosed embodiments are illustrative and not restrictive.

I claim:

1. An advanced acoustic awareness platform comprising:
    an acoustic sensor array configured to capture variable duration environmental sounds; and
    one or more processors configured to execute the following:
        receive the captured variable duration environmental sounds;
        augment the captured variable duration environmental sounds,
        extract features from the augmented variable duration environmental sounds,
        visualize the extracted features, and
        classify the visualization of the extracted features.

2. The advanced acoustic awareness platform of claim 1, wherein the extracted features include a mel-spectrogram.

3. The advanced acoustic awareness platform of claim 1, wherein the extracted features include a fourier transform.

4. The advanced acoustic awareness platform of claim 3, wherein the extracted features include a derivative of the fourier transform.

5. A drone with an advanced acoustic awareness platform, wherein the drone comprises:
    an acoustic sensor array configured to capture variable duration environmental sounds; and
    the advanced acoustic awareness platform includes one or more components configured to process the captured variable duration environmental sound, wherein the one or more components includes an augmentation component determines whether the variable duration environmental sounds satisfy a predetermined threshold such that one or more signals associated with the environmental sounds are augmented when below the predetermined threshold.

6. The drone with an advanced acoustic awareness platform of claim 5, wherein the one or more components include an extraction component that extracts feature from the group comprising: mel spectrogram, fourier transform, and a derivative of the mel spectrogram or fourier transform.

7. The drone with an advanced acoustic awareness platform of claim 6, wherein the one or more components include a visualization component that creates an image from the extracted features.

8. The drone with an advanced acoustic awareness platform of claim 7, wherein the one or more components include a classification component that labels the environmental sounds based on the image produced by the visualization component.

9. A computer-implemented method executed by one or more processors wherein the computer-implemented method comprises:
    receiving captured variable duration environmental sounds;
    augmenting the captured variable duration environmental sounds;
    extracting features from the augmented variable duration environmental sounds;
    visualizing the extracted features; and
    classifying the visualization of the extracted features.

10. The computer-implemented method of claim 9, wherein the extracted features include a mel-spectrogram.

11. The computer-implemented method of claim 9, wherein the extracted features include a fourier transform.

12. The computer-implemented method of claim 11, wherein the extracted features include a derivative of the fourier transform.

* * * * *